April 28, 1959      A. K. NELSON      2,884,217
VEHICLE DISPLAY DEVICE
Filed March 30, 1955      2 Sheets-Sheet 1
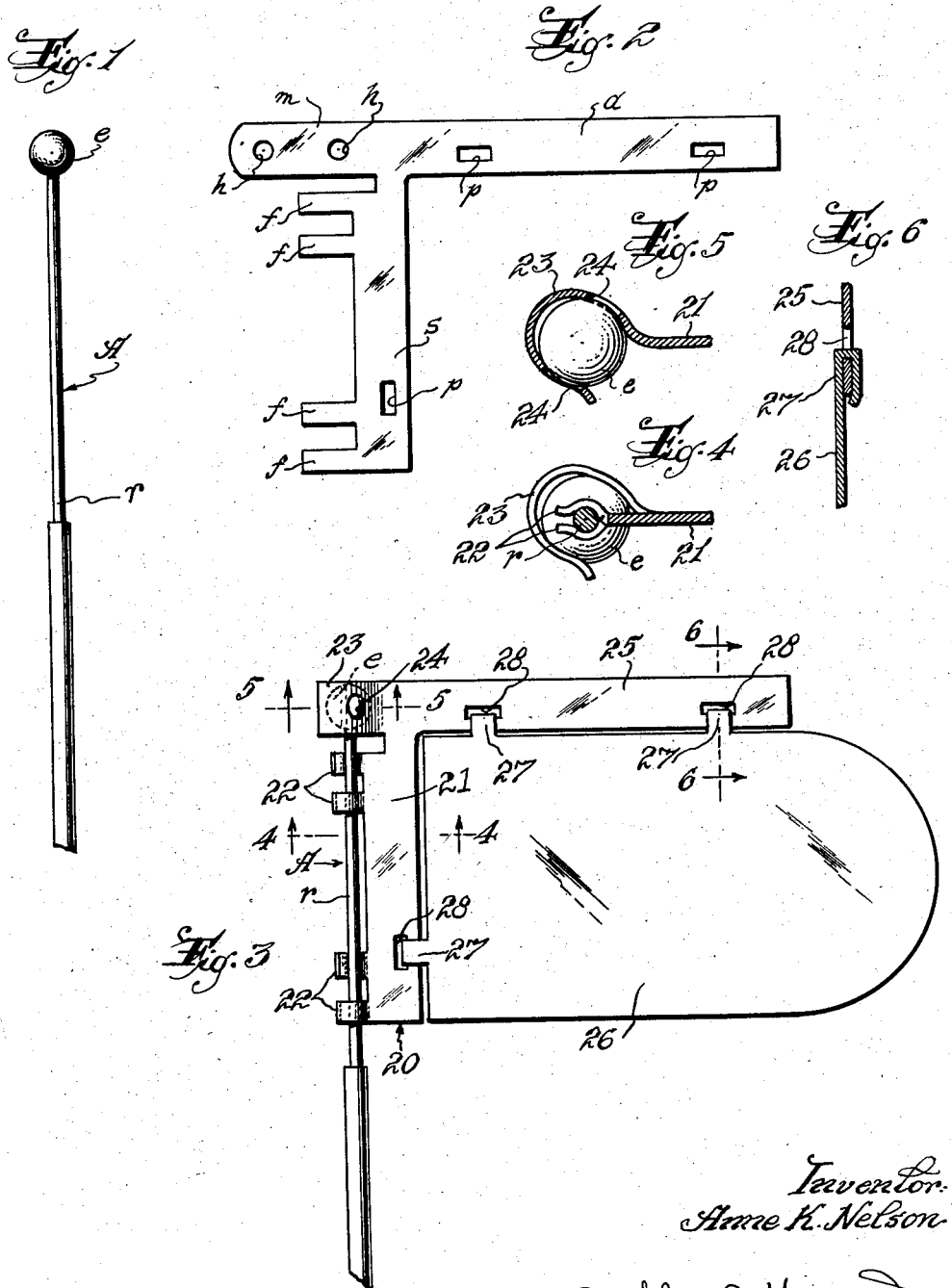

April 28, 1959 A. K. NELSON 2,884,217
VEHICLE DISPLAY DEVICE
Filed March 30, 1955 2 Sheets-Sheet 2
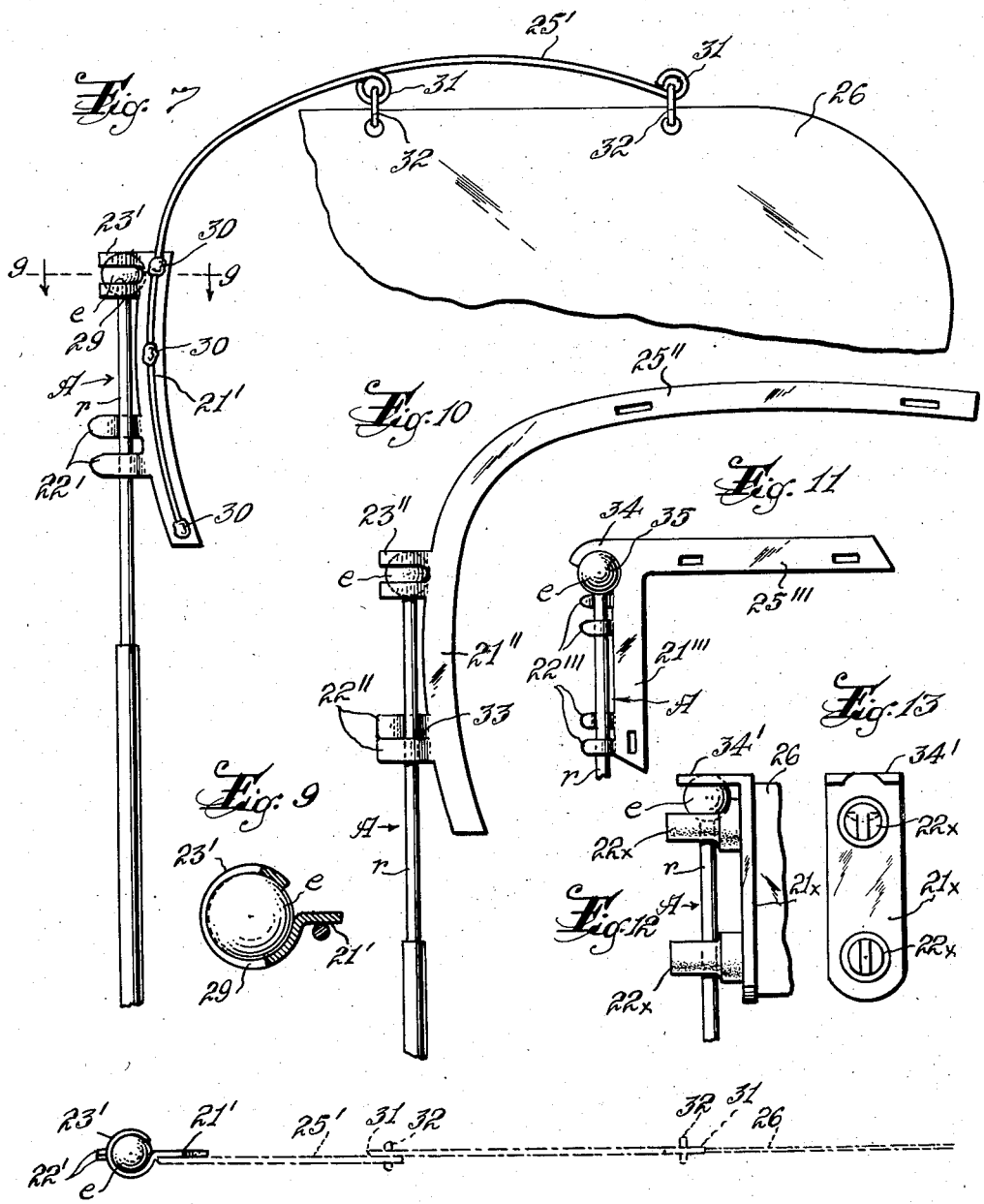
Inventor
Anne K. Nelson
By Dudley B. Howard
Attorney.

United States Patent Office 2,884,217
Patented Apr. 28, 1959

2,884,217
VEHICLE DISPLAY DEVICE
Anne K. Nelson, Morristown, N.J.
Application March 30, 1955, Serial No. 497,947
7 Claims. (Cl. 248—226)

The invention relates in general to display devices and has particular reference to means for detachably mounting flags or flaglike devices, such as ownership identification markers, trip souvenirs, and advertising signs, on the radio aerial of an automobile or other vehicle.

It has become common and increasingly popular practice to fly flags, coontails, and various flaglike devices on the radio aerials of automobiles, but the specific means employed to attach these devices to the aerials have been quite unsatisfactory due to the difficulty experienced in properly sustaining them at the desired level on the rodlike structure of the aerial. Prior to my present invention, it has been the practice to tie the flags or the like very tightly to the aerial rod, or to employ spring-tensioned attaching means which depend entirely upon resilient gripping action to prevent downward gravitational descent of the devices under the influence of wind and vibration.

In view of the above-enumerated disadvantages of the insecure attaching means heretofore employed, it is the primary object of the present invention to provide an attaching bracket which utilizes the ever-present tip ball of the typical automobile radio aerial as positive means to secure the bracket against vertical displacement.

To be more explicit, the improved attaching bracket has a socket member which may be engaged readily with the aerial tip ball in such a manner that upwardly and downwardly presented bearing faces of a ball-embracing socket are directly opposed to the spherical surfaces of the tip ball respectively below and above the equator thereof.

Other objects, advantages and features of the invention will become apparent as the following specific description is read in connection with the accompanying drawings, in which:

Fig. 1 is a fragmentary side elevational view of a typical automobile radio aerial to which the invention is to be applied.

Fig. 2 is a plan view of the sheet metal blank from which one embodiment of the attaching bracket of the invention is formed by simple bending operations; Fig. 3 is a side elevation of the completed bracket with a rigid-type flag connected thereto, the bracket being attached to a radio aerial, partly broken away, in display condition; Fig. 4 is a horizontal section on line 4—4 of Fig. 3; Fig. 5 is a similar view on line 5—5 of Fig. 3; and Fig. 6 is a vertical section on line 6—6 of Fig. 3.

Fig. 7 is a side elevational view similar to Fig. 3, showing a modified form of attaching bracket; Fig. 8 is a plan view of the same, the horizontal arm and flag being shown in broken lines; and Fig. 9 is a horizontal section on line 9—9 of Fig. 7.

Fig. 10 is a side elevational view similar to Fig. 7 but with the flag omitted, showing another modification of the attaching bracket.

Fig. 11 is a side elevational view similar to Fig. 10, showing a still further modified form of attaching bracket.

Fig. 12 is a side elevational view similar to Fig. 7, showing another modification of attaching bracket; and Fig. 13 is a rear elevation of the same detached from the radio aerial.

Referring now in detail to the drawings, wherein like reference characters designate corresponding parts in the several views, Fig. 1 illustrates the upper end portion of a telescopic automobile radio aerial A of the "buggy whip" type which includes the vertically extensible rod $r$ and the surmounting spherical enlargement $e$, or tip ball. It is to an aerial of this standard structure that the flag-attaching bracket 20 of the present invention is to be applied in a position to take advantage of the tip ball $e$ as a thrust bearing, so to speak.

Before proceeding further with detailed description of the attaching bracket 20, it may be explained that the generic term "flag" will be used hereinafter to mean an actual flag of fabric material which is flexible and capable of waving in the breeze or any of the other flaglike display devices customarily supported by an automobile radio aerial, such as the rigid sheet metal flags shown in Figs. 3 and 7 in particular. In fact, conception of the invention was motivated by realization of the need for a personal identification marker in the form of some kind of flag that can be mounted in clearly visible position above one's automobile so that it can be quickly sighted from a great distance in a large parking lot containing the usual veritable "sea" of cars.

In the embodiment of the present invention depicted in Figs. 2 to 6, the attaching bracket 20 essentially includes a vertical base stem 21, which is the element $s$ of the sheet metal blank represented in Fig. 2. This base stem 21 should be of a length substantially equal to the vertical dimension, or "hoist," of the flag to be displayed, and is provided with means to embracingly and detachably engage the rod $r$ of radio aerial A. The rod-engaging means may be in the form of the vertically spaced pairs of clip fingers 22—22, which are produced by appropriately bending the elements $f$ of the blank (Fig. 2) into the inwardly concave shape shown particularly in Fig. 4. By out-turning the tips of fingers 22—22 of each pair, as shown, the inherent resiliency of the sheet metal from which the bracket is made will permit the pairs of fingers to be snapped onto rod $r$ of the aerial A quite readily, after which the fingers will resist detachment. Preferably at the top of base stem 21, a socket member 23 is provided to enclose and at least partially fit the peripheral surface of tip ball $e$ of aerial A. Socket member 23 is formed by curling short arm $m$ of the blank into the somewhat elliptical shape shown particularly in Figs. 4 and 5. Short arm $m$ of the blank is apertured to provide longitudinally spaced holes $h$—$h$ punched therein so that, when arm $m$ has been bent into its final shape, socket member 23 will have holes 24—24 arranged to countersink diametrically opposite side portions of aerial tip ball $e$ to a shallow degree. Since the ball $e$ will be located with its equator substantially intersecting the centers of holes 24—24, the edges of these holes will frictionally bear against areas of the ball's periphery which are downwardly presented below the equator and upwardly presented above the latter. Due to this structural feature, the above-mentioned peripheral areas of ball $e$ and the edges of holes 24—24 will cooperate to form an effective thrust bearing that will positively prevent vertical displacement of attaching bracket 20 on aerial A despite the influences of gravity and operational vibration. By out-turning the tip edge of arm $m$ of the blank during formation of socket member 23, as shown particularly in Figs. 4 and 5, it is possible to snap the socket member onto ball $e$ with little difficulty.

In order that the flag to be displayed may be supported along its horizontal dimension, or "fly," a horizontal arm 25 is formed at right angles to the upper end of base stem 21. This arm 25 corresponds to the long arm $a$ of the blank (Fig. 2). Although support for the fly of a flexible fabric flag is neither required nor desirable, there is some need for such support when a rigid platetype flag, such as that shown at 26, is use. To connect a rigid flag 26 to the bracket 20, the flag may be provided with bendable tabs or ears 27 for engagement with slotlike apertures 28 constituted by the perforations *p* in the blank (Fig. 2).

If it be desired that the flag 26 shall retain a set angular position in azimuth on the aerial, arm *m* of the blank may be curled on such a small radius that considerable energy will be required to open the resulting socket member 23 when snapping it onto aerial ball *e*. Consequently, the socket member will be under such tension that it will tightly grip the ball. This may be especially desirable when the flag is an identification marker, so that the latter may be set perpendicular to the line of sight from a parked car to the entrance to a parking lot, so as to be clearly distinguishable. On the other hand, when the flag is to be free to feather with the wind at all times, the socket member should be curled on a larger radius to reduce friction.

While it has been stated that the blank represented in Fig. 2 preferably is composed of sheet metal, it is to be understood that plastic or other suitable material may be used instead. Whatever material is used, it should possess a slight degree of resiliency and yet be sufficiently plastic for easy bending into the finished product when made of metal.

The modification shown in Figs. 7 to 9, inclusive, is fundamentally similar to the previously described embodiment of Figs. 3 to 6. There is a vertical base stem 21' fabricated from sheet material in very much the same manner. However, in this instance, only one pair of clip fingers 22'—22' is employed and the socket member 23' is aperture to provide a single horizontal slot 29 instead of the opposed holes of the original embodiment. Moreover, instead of making the horizontal supporting arm 25' of sheet material integral with base stem 21', it is constituted by a curved length of spring wire of sufficient stiffness to furnish adequate support for the fly of flag 26. The base end portion of wire arm 25' may be secured in any suitable manner to base stem 21', as by the spot soldering represented at 30. Eye loops 31—31 are formed in the overhanging wire arm 25' for connection of flag 26 thereto by means of links 32—32.

The embodiment of the invention disclosed in Fig. 10 differs from the one shown in Figs. 7 to 9 principally in the substitution for the wire structure of a curved horizontal arm 25'' formed integral with base stem 21'', these two elements being stamped from sheet material in the original blank. The socket member 23'' is identical in structure with socket member 23' of the previously described embodiment, but the clip fingers 22'' are much closer together, being formed in production of the blank by mere slits 33 instead of the wide slots previously used.

Fig. 11 discloses another modification in which vertical base stem 21''' and horizontal arm 25''' are substantially identical with the structure shown in Figs. 1 to 6. However, socket member 23''' is formed by a short arm 34 which is not bent out of the plane of the base stem and horizontal arm. This short arm 34 and the upper portion of base stem 21''' contiguous to said arm are punched to provide an outwardly open semi-circular hole 35 of substantially the same diameter as ball *e* of aerial A. In assembling this bracket on the aerial, arm 25''' is tipped up during lateral insertion of ball *e* into hole 35, after which said arm is lowered until clip fingers 22''' have snapped onto rod *r*.

In Figs. 12 and 13, there is shown a still further modification which is molded from plastic material. In fact, the flag 26 may be molded integral with base stem 21x of the bracket, as shown, instead of being connected thereto by separate means. In this example, the plane of stem 21x is perpendicular to that of the short horizontal arm 34' which forms the upper part of a socket member. Two vertically spaced bifurcated arms project from the rear face of stem 21x oppositely with respect to flag 26 to form the two pairs of clip fingers 22x. The uppermost pair of fingers 22x and arm 34' are provided with opposed socket forming recesses to partially fit tip ball *e* of aerial A. Clip fingers 22x engage the aerial rod *r* in the usual manner.

It will be understood that it is intended to cover all changes and modifications of the examples of the invention herein chosen for the purpose of illustration which do not constitute departures from the spirit and scope of the invention.

I claim:

1. A display device including a supporting bracket for attachment to a rod-type vehicle radio aerial having a laterally unobstructed surmounting tip ball, said bracket including a socket member having a socket constructed and arranged to embracingly and rotatably fit said tip ball and being in the form of a horizontally curled arm of sheet material having at least one aperture opening laterally therethrough to countersink a portion of said tip ball in the equatorial zone thereof, and a base stem extending vertically downward from the socket member, said socket member and base stem being of integral sheet material construction, means provided on said base stem to detachably engage the rod of the radio aerial and being in the form of vertically adjacent clip fingers integral therewith of inwardly concave shape to embracingly engage the aerial rod in spaced relation to the ball thereof.

2. The combination of an automobile radio aerial comprising a vertical rod and a laterally unobstructed surmounting spherical tip enlargement and a display device including a supporting bracket with a socket member having a socket constructed and arranged to embracingly and rotatably fit said aerial enlargement.

3. The invention defined in claim 2, wherein the socket member is in the form of a horizontally curled arm of sheet material having opposed holes therein to countersink diametrically opposite portions of the aerial ball in the equatorial zone thereof.

4. The invention defined in claim 2, to which is added a base stem extending vertically from the socket member, said socket member being in the form of a flat horizontal arm and being integral and co-planar with said base stem, said arm and base stem being provided with a semi-circular hole at the contiguous areas thereof to fit the aerial enlargement, and plural clip fingers projecting laterally from the base stem to embracingly engage the rod of the radio aerial.

5. The invention defined in claim 2, wherein a base stem is added to the socket member in downwardly projecting relation thereto, wherein the base stem and socket member are flat in structure and arranged with the respective planes thereof at right angles, wherein at least one pair of clip fingers are provided on the base stem and project in the same direction therefrom as the socket member to embracingly engage the rod of the radio aerial, the socket member and clip fingers being closely adjacent and having opposed recesses in their adjacent faces which cooperate to form the socket to fit the spherical enlargement of the radio aerial.

6. The invention defined in claim 3 wherein the aperture in the horizontally curled arm of the socket member is a longitudinal slot subtending an angle of at least 180 degrees.

7. The invention defined in claim 3 wherein the aperture in the horizontally curled arm of the socket member is a pair of diametrical holes.

References Cited in the file of this patent

UNITED STATES PATENTS

| 975,114 | Blank | Nov. 8, 1910 |
| 2,342,017 | Shepherd | Feb. 15, 1944 |
| 2,535,112 | Woody | Dec. 26, 1950 |
| 2,648,091 | Jones | Aug. 11, 1953 |